Patented Jan. 29, 1924.

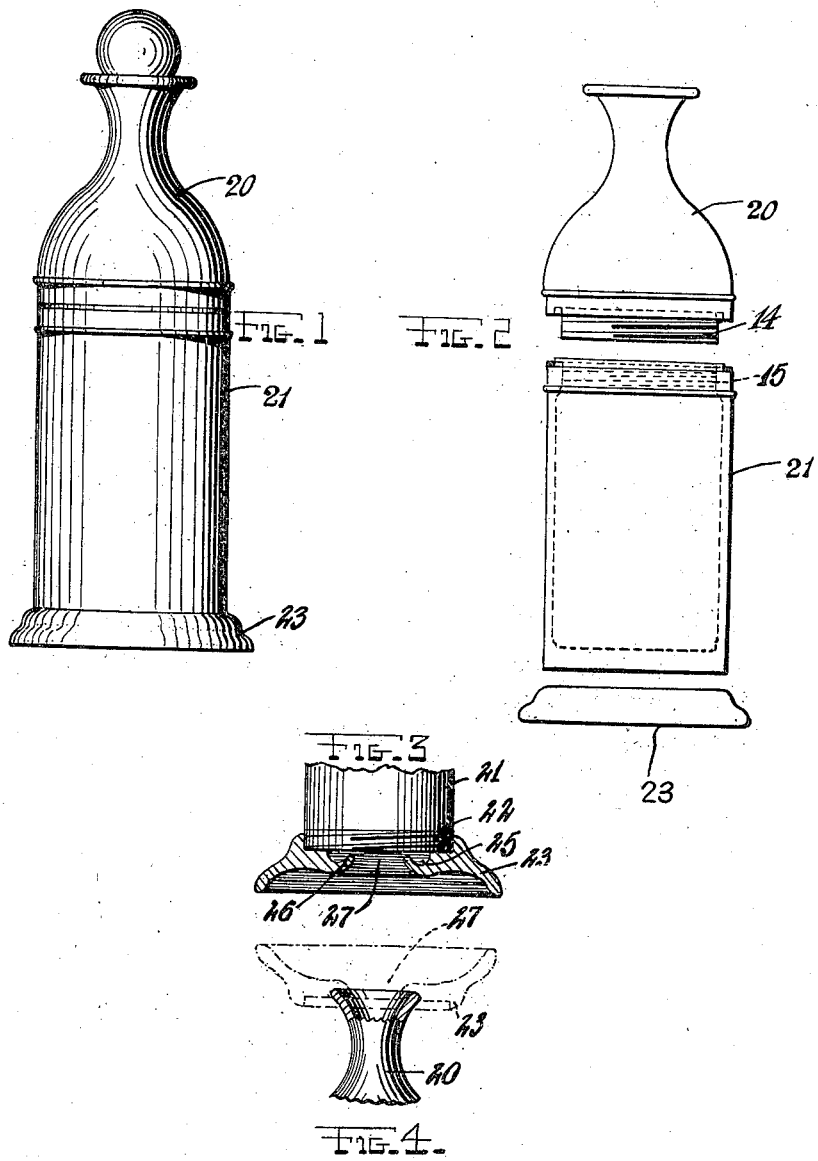

1,482,215

UNITED STATES PATENT OFFICE.

LOUIS BONDIETTI, NEW YORK, N. Y.

COMBINATION THERMO BOTTLE.

Application filed October 26, 1922. Serial No. 597,036.

*To all whom it may concern:*

Be it known that I, LOUIS BONDIETTI, a citizen of Switzerland, residing at New York, in the county of New York and State of New York, have invented certain new and useful Improvements in Combination Thermo Bottles, of which the following is a specification.

This invention relates to bottles, having more particular reference to a bottle comprising a number of detachable parts whereby it may be made to serve as a bottle, jar, or tray, the invention having for an object to provide an improved bottle of this type, a further object relating to the provision of a novel funnel device to facilitate filling of the bottle.

For further comprehension of the invention, and of the objects and advantages thereof, reference will be had to the following description and accompanying drawings, and to the appended claims in which the various novel features of the invention are more particularly set forth.

Fig. 1 is a side view of my improved bottle.

Fig. 2 is a similar view, but showing the different parts detached from one another.

Fig. 3 is a fragmentary view, part vertical section and part elevation, showing the combination stand and funnel applied to the bottle as a stand.

Fig. 4 is a similar view showing it applied as a funnel.

As here shown my improved bottle may comprise upper and lower sections 20 and 21. The upper section 20 is appropriately curved to form the neck and shoulders of the bottle, while the lower section 21 is cylindrical in shape. The upper section is provided at its lower end with an annular extension or flange 14 which is exteriorly screw threaded and is adapted to engage the interior screw threads 15 in the upper end of the lower section 21. The lower section 21 has a solid bottom and is formed at its lower ends with exterior screw-threads 22 adapted to screw into a shallow recess in the top of a base or stand, the latter being flared outwardly and downwardly so as to provide a short and wide funnel when the stand is inverted as in Fig. 4.

Formed in the bottom of the recess into which the bottle section screws 21 is an annular depression 25, leaving an annular upwardly inclined neck 26 surrounding a central opening 27 in the stand which forms the small end of the funnel. The parts are so proportioned that this neck 26 will fit snugly into the mouth of the bottle as indicated in Fig. 4, the lip of the bottle being accommodated in the annular recess 25.

It will be understood of course that the walls of my improved bottle may be of the hollow vacuum construction adapted to resist passage of heat, my improved bottle being particularly useful for campers, picknickers, or the like.

Having thus described my invention what I claim as new and desire to protect by Letters Patent of the United States is as follows:

1. In a bottle, a removable base adapted to form a funnel for engagement with the mouth of the bottle.

2. In a bottle, a removable base adapted to form a funnel, said base having a central neck adapted to engage in the mouth of the bottle to form the lower end of a funnel.

3. In a bottle, a body element, a base into which the said element is screwed, said base being of generally conical form and presenting an upwardly projecting neck adapted to engage in the mouth of the bottle to form the lower end of a funnel.

In testimony whereof I have affixed my signature.

LOUIS BONDIETTI.